Aug. 25, 1936.  S. L. CONNELL  2,052,449
MOLDING MACHINE
Filed Feb. 25, 1933  2 Sheets-Sheet 1
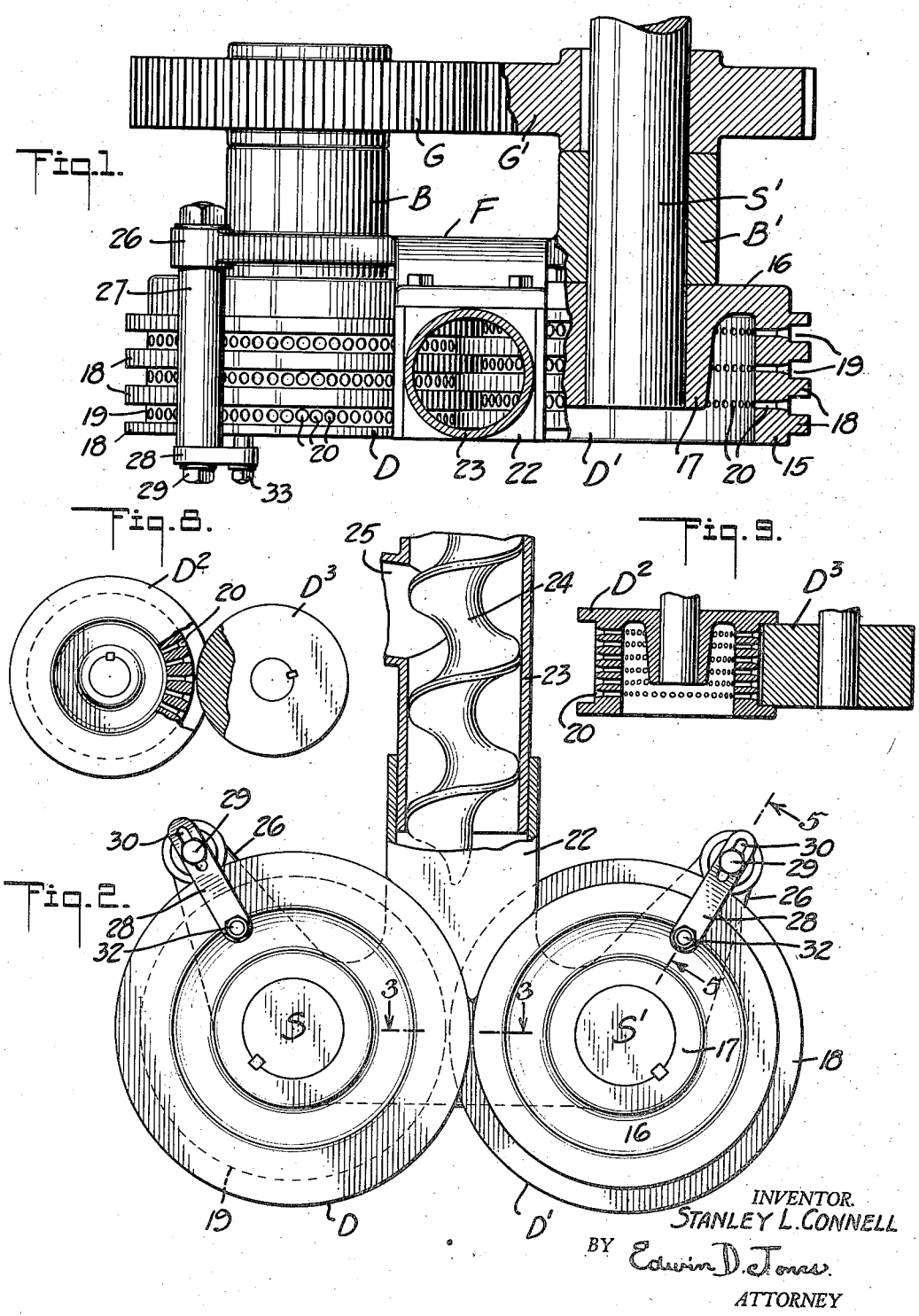
INVENTOR.
STANLEY L. CONNELL
BY Edwin D. Jones
ATTORNEY Aug. 25, 1936.  S. L. CONNELL  2,052,449
MOLDING MACHINE
Filed Feb. 25, 1933   2 Sheets-Sheet 2
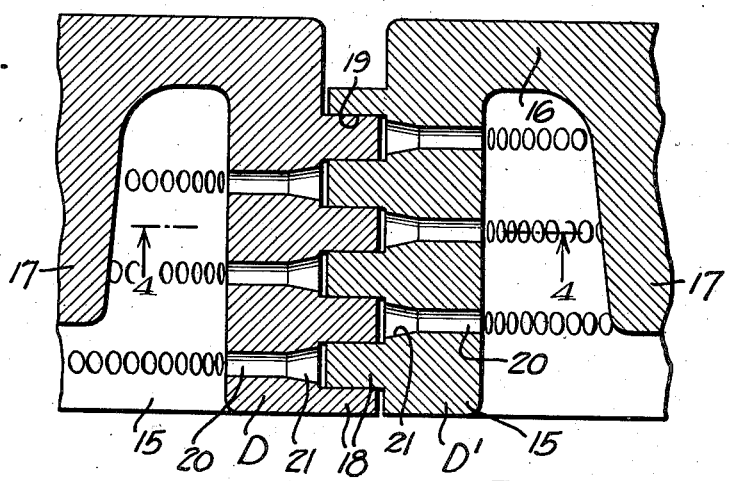
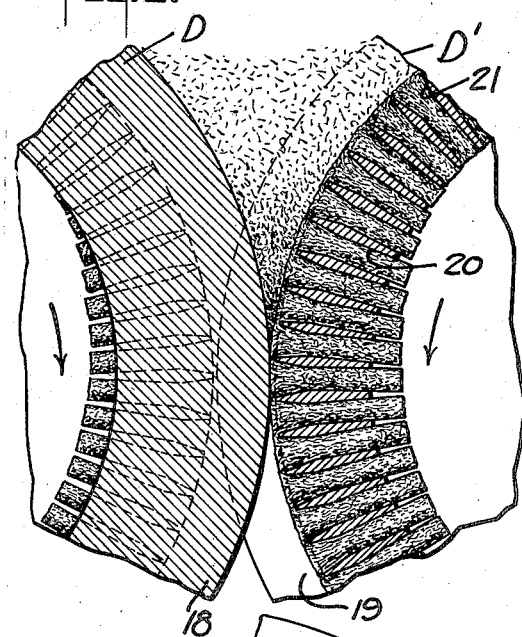
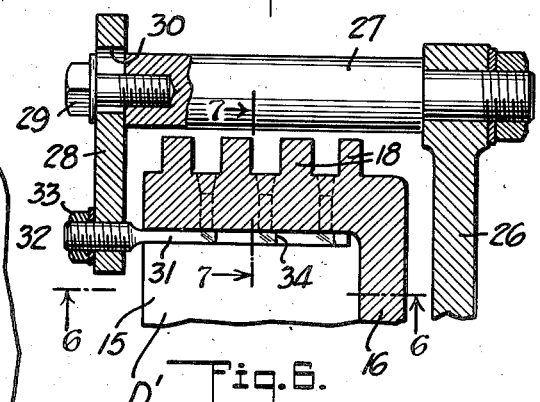
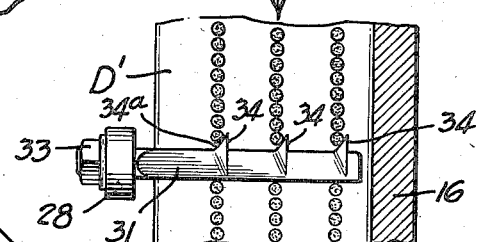
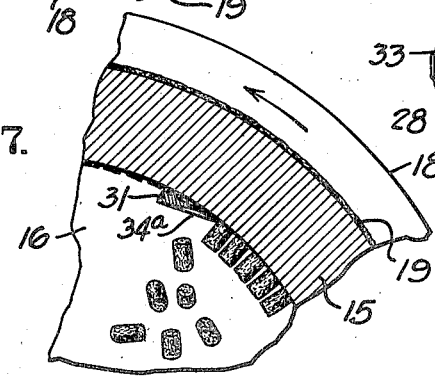
INVENTOR.
STANLEY L. CONNELL
BY Edwin D. Jones
ATTORNEY Patented Aug. 25, 1936

2,052,449

UNITED STATES PATENT OFFICE 2,052,449

MOLDING MACHINE

Stanley L. Connell, Glendale, Calif.

Application February 25, 1933, Serial No. 658,580

7 Claims. (Cl. 107—8)

My invention has reference to machines for continuously molding various forms of plastic materials into articles of various forms and for diversified purposes, and although my invention is herein concretely exemplified by a machine for molding comminuted and plastic food combinations into pellets for fowl, animal, and human consumption, it is to be understood that my invention is not structurally nor functionally limited or restricted to this adaptation.

Specifically, my invention refers to pellet molding machines of the type embodying an expressing die and a pressing die correlated and continuously operable to compress and then express or extrude the plastic material in the form of solidified pellets. All machines of this character with which I am familiar operate on the principle of unidirectional pressure for compressing and expressing the material through the expressing die. By unidirectional pressure is meant the application of pressure in one direction only, and as applied to plastic materials, it is a pressure which does not effect or permit of any change in slip angle of the mass so that its particles are immovable relatively once the mass attains maximum compression and, hence, the material is no longer fluid.

This unidirectional form of pressure in pellet molding machines, creates many disadvantages, the most serious of which is the great amount of power necessary to operate the machine because of the high pressures required to express the plastic material from the expressing die. Unidirectional pressure is applied to the material by the pressing die, and because of the absence of change in slip angle the material loses its fluidity and becomes extremely difficult of introduction into the restricted pellet forming passages of the expressing die. This necessitates the application of extremely high pressures to introduce and express the material from the expressing die, which is the main cause of the high power consumption.

The foregoing disadvantage resultant of unidirectional pressure gives birth to another and equally serious disadvantage. This is the rapid wear of the dies due to the aforedescribed requisite high pressures, as well as to the metal to metal contact of the dies in the machines of the type to which I am referring. As the dies wear the plastic material leaks from between the dies so that there is a loss of both pressure and material, resulting in rapid decrease in pellet producing capacity and non-uniformity in density of the pellets.

My invention has for a paramount purpose the provision of a molding machine for the continuous formation of pellets and the like, which is characterized by the correlation of the pressing and expressing dies so that the slip angle of the plastic material is constantly changed and, in consequence of which, the material, although compressed to produce pellets of the requisite density, is maintained fluid and thus capable of being pressed into and expressed from the expressing die with only a minimum consumption of power whereby, the disadvantages above recited in connection with present machines are eliminated, and a machine is produced which consumes considerably less power per ton of material pelleted; a machine of greatly increased pellet forming capacity; and one showing less die wear, wherefore, the original high capacity of the machine is maintained for a longer period of time.

It is also a purpose of my invention to provide expressing and pressing dies which possess such structural characteristics that their initial cost is lower than other dies, and they can be hardened and ground to increase their resistance to wear. Furthermore, the correlation of the dies is such that there is no metal to metal contact, thus further reducing wear.

I will describe only one form of molding machine embodying my invention, and will then point out the novel features thereof in claims.

In the accompanying drawings:

Fig. 1 is a view showing in top plan and partly in section, one form of molding machine embodying my invention.

Fig. 2 is a view showing the molding machine in front elevation and partly in section.

Fig. 3 is an enlarged sectional view taken on the line 3—3 of Fig. 2.

Fig. 4 is a sectional view taken on the line 4—4 of Fig. 3.

Fig. 5 is an enlarged sectional view taken on the line 5—5 of Fig. 2.

Figs. 6 and 7 are sectional views taken on the lines 6—6 and 7—7 respectively of Fig. 5.

Fig. 8 is a view showing in side elevation a pair of dies illustrated primarily for the purpose of showing the principle of my invention.

Fig. 9 is a sectional view taken on the line 9—9 of Fig. 8.

In carrying out my invention, I provide a pair of wheel dies made of steel or other suitable metal and each of which comprises an annular body 15 connected by a web 16 to a hub 17 spaced from the body and extending from the same side of the web as the body. The body 15 is formed on its outer periphery with a plurality of circumferentially extending ribs or tongues 18 each of which is continuous and spaced apart in parallelism from an adjacent rib.

The ribs 18, on either die, coact to form intervening grooves 19 which are likewise circumferentially extending and continuous. As the ribs on one die can and are received in the grooves of the other die, as best illustrated in Fig. 3. In other words, the ribs of one die are interfitting with those of the other, and the fit is such that when the two dies are rotated in opposite directions, the ribs of one die will roll between the ribs of the other die. The side walls of any one rib have a close fit with the side walls of the adjacent ribs of the other die, but the outer peripheries of the ribs are slightly spaced from the bottom walls of the grooves, and hence, out of physical contact with the body of the other die, for a purpose to be described hereinafter.

As again shown to advantage in Fig. 3 the body 15 of each die is formed with a multiplicity of radially extending passages 20, and, in the present instance, these passages are arranged in three annular series to correspond to the three grooves 19. The passages of each series extend from the inner periphery of the die body to the outer periphery thereof and so that their outer ends are in communication with the bottom of the respective groove.

In the present instance, each passage 20 has an orifice 21 at its entrance end which is tapered or of frustro-conical form to merge into the uniform bore of the remainder of the passage. The tapered orifice is referred to as at the entrance end of the passage because this is the end through which the plastic material enters the passage to be subsequently expressed or extruded from the exit end of the passage at the inner periphery of the die body.

As shown in Figs. 1 and 2, the two dies D and D' are keyed to the forward end of shafts S and S', respectively, such shafts being supported in spaced parallelism by bearings B and B' carried by a frame F. Thus the shafts support the dies with their peripheries opposed or confronting, and so that the ribs interfit, as previously described herein.

The dies D and D' are positively rotated in opposite directions by the provision of gears G and G' fixed to shafts S and S', the shaft S in turn being driven from any suitable source of power (not shown) A chute 22 carried by the frame F extends upwardly from between the dies with its lower end disposed to deliver plastic material between the confronting peripheries of the die D and D'. The upper end of the chute 22 communicates with another chute 23 in which rotates a screw 24 that serves to forcibly feed the plastic material downwardly between the dies. Plastic material is delivered to the chute 23 from a branch chute 25 communicating with a hopper (not shown) containing a supply of plastic material.

As illustrated in Figs. 1, 2, and 5, the frame F includes a pair of upstanding arms 26, one for each of the dies D and D'. Extending forwardly from the upper end of each arm is a horizontally disposed post 27, and to the forward end of this post is a hanger 28 secured thereto by a screw 29. The hanger is provided with a slot 30 through which the screw extends to permit adjustment of the hanger vertically and to thereby permit corresponding adjustment of an abutment 31 fixed to the lower end of the hanger.

The abutment has an enlargement 32 at one end which is threaded in a hanger to permit lengthwise adjustment of the abutment, and any adjustment can be maintained by a nut 33 threaded on the enlargement, as shown in Fig. 5. As shown in Fig. 6, the abutment 31 comprises a flat elongated body which is disposed at the inner periphery of the corresponding die body, and it is provided with a plurality of laterally extending blades 34, one for each series of passages 20, with diagonal cutting edges $34^a$ for serving the material as extruded from the passages in the formation of the pellets. The diagonal cutting edges $34^a$ serve to project the pellets laterally as they are severed and in this manner a severed pellet is prevented from being projected against and breaking off an unsevered pellet.

Before describing the operation of my machine in the molding of pellets, I will first describe the functional relationship of the dies D and D' in order that a clear understanding may be had of the mechanical principle involved in the attainment of the change in slip angle of the material to maintain the latter fluid when compressed.

The form of dies shown in Figs. 8 and 9 illustrate a simple embodiment of my principle. As here shown a die $D^2$ is provided with pellet-forming passages 20 through which plastic material is expressed by another die $D^3$, the latter in this instance, being without passages. Thus the die $D^2$ is an expressing die in that it is through this die that the material is expressed to form the pellets. The die $D^3$ is a pressing die because its function is to press the material into the passages. The die $D^2$ is flanged at its opposite edges to form a single intervening groove, and thus it can be considered the equivalent of either die D or D' if formed only with a single groove. The die $D^3$ is the equivalent of either die D or D' if formed only with a single rib except that in this instance there is no rib, but the periphery of the die $D^3$ has the function of a rib in that it has a sliding fit between the flanges of the die $D^2$, while its periphery is slightly spaced from the periphery of the die $D^2$.

Disregarding the flanges thereof, the diameter of the die $D^3$ may be greater or less than that of the die $D^2$ if driven at the same speed, and of the same diameter if driven at a different speed. The essential thing to be attained is a difference in linear speeds of the peripheries of the two dies, for it is by this differential peripheral speed that I accomplish the change in slip angle of the plastic material to establish and maintain fluidity thereof.

The dies D and D' have the same outside or rib diameter, but by reason of the difference in rib diameter of one die and the groove diameter of the other die, that is the diameter of the die as defined by the bottom of the groove, the two dies in effect are of different diameters so that when driven at the same speed there is a differential linear speed between the rib diameter of one die and the groove diameter of the other die. In this manner is accomplished the same effect as in the dies shown in Figs. 8 and 9. Where the dies D and D' are each formed with a plurality of ribs and grooves, the differential speed effect of the dies of Figs. 8 and 9 is multipliied, and each die D and D' attains the status of a combined expressing and pressing die.

The operation of the molding machine is as follows:

Under rotation of the screw 24, the plastic material to be formed into pellets is forcibly fed from the lower end of the chute 22 downwardly between the confronting portions of the peripheries of the dies D and D', the dies meanwhile being continuously rotated in opposite directions as indicated by the arrows in Fig. 4 and so that the upper portions of the confronting peripheries move downwardly. By reference to Fig. 4, it will be seen that the outer face of any one rib 18, and the bottom wall of the corresponding groove 19 coact to form a wedge shaped gap which extends above a line intersecting the axes of the dies. The lower end or apex of this gap is defined by the slight clearance between the rib and the groove.

This clearance, however, is filled immediately upon initial introduction of plastic material between the dies to prevent the material being expressed downwardly between the dies. The plastic material as delivered to the dies fills the gap between the opposed faces thereof, and under rotative movement of the dies the mass is compressed and a film of the material corresponding in thickness to the clearance between any one rib and groove bottom, is immediately formed on the bottom of the groove, as clearly illustrated in Fig. 4. That a similar film is not formed on the face of the corresponding rib is due to the fact that the periphery of the rib has a greater linear speed than that of the groove face, and this causes the rib to slide on the material leaving it pressed on the groove face.

Thus with the bottom of the gap closed, subsequent material introduced can not pass downward out of the gap and, hence, must pass into the passages 20 with continued rotation of the dies. However, before describing the actual pellet forming operation of the dies, movement of the plastic material as a result of the differential speeds of the rib and groove surfaces will now be explained.

Irrespective of whether the material is forcibly fed or merely fed by gravity to the dies, the peripheries of the two dies function to compress the material as they move downwardly. Remembering that in each instance a rib is traveling at a greater linear speed than the corresponding groove bottom, it will be understood that the material although being continuously compressed and thus constantly tending to assume a non-fluid state, the difference in speed of travel of the mating rib and groove surfaces operates to continuously change the slip angle of this compressed mass so that its particles are maintained sufficiently fluid to cause the material to be readily pressed into the passages of the die.

Reference to Fig. 4 will disclose that the pellets begin to form at the upper ends of the opposed portions of the dies, the material being continuously pressed into the passages as the dies move downwardly, until it is expressed from the exit ends at the inner peripheries of the dies. Such expressing continues until the dies reach the closed end of the gap when the extruded material has attained the length desired to form a pellet.

The formation of any one pellet consists in pressing the compressed material into the orifice 21 of any one passage. By reason of the tapered formation of the orifice the material is readily admitted to the passage, and yet, an abutment is produced in the passsage which resists movement of the material through the passage sufficiently to further compress the material or at least to maintain its original degree of compression. Thus the material as finally expressed is not only of the required density but its density is uniform throughout.

Under rotative movement of the dies, the blades 34 of the abutments 31 function to sever the material extruded from the passages to form the final pellets. The precise manner of severing and projecting the pellets to prevent breakage of the unsevered extrusions, has been previously explained herein. With the abutments positioned in close proximity to the inner periphery of the dies, as shown in Figs. 5 and 7, the pellets are cut off in uniform length.

The machine as here designed effects extrusion of the plastic material in length sufficient to form pellets of a desired length during each revolution of the dies. Should it be desired to decrease the length of the pellets formed the screw feed can be displaced by a mere gravity feed which obviously reduces the pressure on the material and thus the material extruded doing one revolution of the dies is correspondingly decreased.

Although I have herein shown only one form of molding machine embodying my invention and two forms of dies likewise embodying my invention, it is to be understood that various changes and modifications may be made herein without departing from the spirit of the invention and the spirit and scope of the appended claims.

What I claim is:

1. A machine for continuously molding plastic materials into pellets and the like having; a pair of rotatable annular dies arranged with their peripheries confronting but spaced apart to provide an intervening gap of wedge form, one of the dies being an expressing die and having a plurality of passages radially therein which communicate with the inner and outer peripheries of the die, and the other die a pressing die for forcing the pellet material into and extruding it from said passages to form pellets; mechanism for rotating the dies in opposite directions and so that they have different peripheral speeds; and means for feeding a plastic material into said gap whereby, under rotative movement of the dies their peripheries subject the material to a progressively increasing pressure which rises to a maximum at the restricted portion of the gap and causes the material to adhere to the periphery of the extrusion die in a film corresponding in thickness to the restricted portion of the gap and to thus seal the gap at this point, and to simultaneously advance the material to the restricted portion of the gap by reason of the differential peripheral speeds of the dies so that the compressed material is continuously moved and pressed into and through said openings to successively and continuously form pellets.

2. A machine for continuously molding plastic materials into pellets and the like having; a pair of rotatable annular dies arranged with their peripheries confronting; continuous ribs on the outer peripheries of both of the dies to form intervening grooves, the grooves of one die receiving the ribs of the other; both of said dies having passages extending from the inner to the outer periphery thereof so as to communicate with the grooves; and means for rotating the dies in opposite directions.

3. A machine for continuously molding plastic materials into pellets and the like having; a pair of rotatable annular dies arranged with their peripheries confronting; continuous ribs on the outer peripheries of both of the dies to form intervening grooves, the grooves of one die receiving the ribs of the other; both of said dies having passages extending from the inner to the outer periphery thereof so as to communicate with the grooves; said passages having tapered entrance ends.

4. A machine for molding plastic materials into pellets and the like having; a pair of rotatable annular dies arranged with their peripheries confronting; one of the dies having a continuous groove in its periphery; a continuous rib on the periphery of the other die having a rotating and sliding fit in said groove; the grooved die having openings therein extending from the inner to the outer periphery thereof and communicating with said groove; and mechanism for rotating the dies in opposite directions.

5. A machine for continuously molding plastic materials into pellets and the like having; a pair of wheel dies arranged with their peripheries opposed; one of the dies being an expressing die and provided with a plurality of pellet-forming passages extending radially from the inner to the outer periphery of the die; the other die being a pressing die; mechanism for positively rotating the dies in opposite directions and so that the peripheral speed of one die is greater than that of the other; means for continuously feeding plastic material between the peripheries of the dies so that the dies coact to compress the material and continuously express it through the passages to the inner periphery of the expressing die to form pellets; and an abutment at the inner periphery of the expressing die for severing the pellets in such manner that any single pellet clears an unsevered pellet.

6. A machine for continuously molding plastic materials into pellets and the like having; a pair of wheel dies arranged with their peripheries opposed; one of the dies being an expressing die and provided with a plurality of pellet-forming passages extending radially from the inner to the outer periphery of the die; the other die being a pressing die; mechanism for positively rotating the dies in opposite directions and so that the peripheral speed of one die is greater than that of the other; means for continuously feeding plastic material between the peripheries of the dies so that the dies coact to compress the material and continuously express it through the passages to the inner periphery of the expressing die to form pellets; and an abutment at the inner periphery of the expressing die and including a blade having a cutting edge adapted under movement of the expressing die, to successively sever the pellets in such manner that any single pellet clears an unsevered pellet.

7. A machine for molding plastic material into pellets and the like, having; a pair of rotatable annular dies arranged with their peripheries confronting but spaced apart to form an intervening gap, each of said dies having a plurality of passages radially therein communicating with the inner and outer peripheries thereof, one of said dies having its outer periphery formed with a continuous groove in which the outer periphery of the other die is rotatably fitted; means for rotating the dies in opposite directions so that they have different peripheral speeds; and means for feeding a plastic material into said gap.

STANLEY L. CONNELL.